United States Patent
Bailey et al.

(10) Patent No.: US 11,953,763 B2
(45) Date of Patent: *Apr. 9, 2024

(54) CONTACT LENS COMPRISING A SUPERIOR LENTICULAR ASPECT

(71) Applicant: Ohio State Innovation Foundation, Columbus, OH (US)

(72) Inventors: Melissa D. Bailey, Westerville, OH (US); Joseph T. Barr, Dublin, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 423 days.

This patent is subject to a terminal disclaimer.

(21) Appl. No.: 17/331,079

(22) Filed: May 26, 2021

(65) Prior Publication Data

US 2021/0382324 A1 Dec. 9, 2021

Related U.S. Application Data

(63) Continuation of application No. 16/782,816, filed on Feb. 5, 2020, now Pat. No. 11,022,817, which is a continuation of application No. 16/220,577, filed on Dec. 14, 2018, now Pat. No. 10,598,957, which is a continuation of application No. 15/274,159, filed on Sep. 23, 2016, now Pat. No. 10,191,302.

(60) Provisional application No. 62/222,376, filed on Sep. 23, 2015.

(51) Int. Cl.
G02C 7/04 (2006.01)

(52) U.S. Cl.
CPC .............. *G02C 7/048* (2013.01); *G02C 7/043* (2013.01); *G02C 7/045* (2013.01); *G02C 7/047* (2013.01); *G02C 7/049* (2013.01)

(58) Field of Classification Search
CPC ........ G02C 7/043; G02C 7/045; G02C 7/047; G02C 7/048; G02C 7/049
USPC ............ 351/159.03, 159.19, 159.36, 159.39, 351/159.4, 159.6, 159.61, 159.68
See application file for complete search history.

(56) References Cited

U.S. PATENT DOCUMENTS

| 4,573,775 A | 3/1986 | Bayshore |
| 4,614,413 A | 9/1986 | Obssuth |
| 4,666,267 A | 5/1987 | Wichterle |
| 4,859,049 A * | 8/1989 | Muller ..................... G02C 7/04 351/159.74 |

(Continued)

FOREIGN PATENT DOCUMENTS

| CN | 101506717 | 8/2009 |
| CN | 102621710 | 8/2012 |

(Continued)

OTHER PUBLICATIONS

Barr, Joseph T. "High Ametropia." Contact Lens Practice, edited by Nathan Efron, 2nd ed., Butterworth Heinemann Elsevier, 2010, pp. 298-302. (Year: 2010).*

(Continued)

*Primary Examiner* — Nicholas R. Pasko
(74) *Attorney, Agent, or Firm* — Meunier Carlin & Curfman LLC

(57) ABSTRACT

Disclosed herein is a contact lens comprising a rounded, minus-carrier, lenticular-like curve over a central, upper portion of the lens that allows the contact lens to translate upwards in downgaze.

20 Claims, 3 Drawing Sheets

(56) References Cited

U.S. PATENT DOCUMENTS

| | | | |
|---|---|---|---|
| 4,896,958 | A | 1/1990 | Ames et al. |
| 5,056,908 | A | 10/1991 | Cohen |
| 5,104,213 | A | 4/1992 | Wolfson |
| 5,125,728 | A | 6/1992 | Newman et al. |
| 5,141,301 | A | 8/1992 | Morstad |
| 5,166,710 | A | 11/1992 | Hofer et al. |
| 5,245,366 | A | 9/1993 | Svochak |
| 5,296,880 | A | 3/1994 | Webb |
| 5,500,695 | A | 3/1996 | Newman |
| 5,532,768 | A | 7/1996 | Onogi et al. |
| 5,764,339 | A | 6/1998 | Horton |
| 5,912,719 | A * | 6/1999 | Baude ............... G02C 7/04 351/159.02 |
| 5,971,542 | A | 10/1999 | Volker et al. |
| 5,988,813 | A | 11/1999 | Neadle et al. |
| 6,092,899 | A | 7/2000 | Wanders |
| 6,109,749 | A | 8/2000 | Bernstein |
| 6,217,896 | B1 | 4/2001 | Benjamin |
| 6,409,339 | B1 | 6/2002 | Wanders |
| 6,491,392 | B2 | 12/2002 | Roffman et al. |
| 6,773,107 | B2 * | 8/2004 | Ye ............... G02C 7/044 351/159.41 |
| 6,921,168 | B2 | 7/2005 | Lindacher et al. |
| 7,052,133 | B2 | 5/2006 | Lindacher |
| 7,080,906 | B2 | 7/2006 | Lindacher |
| 7,201,480 | B2 | 4/2007 | Neadle et al. |
| 7,384,143 | B2 | 6/2008 | Hall et al. |
| 7,543,935 | B2 | 6/2009 | Ezekiel |
| 7,560,056 | B2 | 7/2009 | Van Gemert et al. |
| 7,695,135 | B1 | 4/2010 | Rosenthal |
| 7,695,435 | B2 | 4/2010 | Benson et al. |
| 8,485,662 | B2 * | 7/2013 | Collins ............... G02C 7/044 351/159.36 |
| 9,823,493 | B2 | 11/2017 | Caldarise et al. |
| 10,175,504 | B2 | 1/2019 | Goto et al. |
| 10,191,302 | B2 * | 1/2019 | Bailey ............... G02C 7/047 |
| 10,598,957 | B2 * | 3/2020 | Bailey ............... G02C 7/048 |
| 11,022,816 | B2 * | 6/2021 | Bailey ............... G02C 7/043 |
| 11,022,817 | B2 * | 6/2021 | Bailey ............... G02C 7/048 |
| 11,320,673 | B2 * | 5/2022 | Bailey ............... G02C 7/048 |
| 2002/0075447 | A1 | 6/2002 | Andino et al. |
| 2003/0151718 | A1 | 8/2003 | Marmo et al. |
| 2004/0017542 | A1 | 1/2004 | Lindacher et al. |
| 2004/0057010 | A1 | 3/2004 | Altmann |
| 2005/0068489 | A1 | 3/2005 | Hall et al. |
| 2005/0099595 | A1 | 5/2005 | Lindacher |
| 2005/0251065 | A1 | 11/2005 | Henning et al. |
| 2006/0290883 | A1 | 12/2006 | Rosenthal |
| 2008/0013044 | A1 | 1/2008 | Wanders |
| 2008/0262812 | A1 | 10/2008 | Arata et al. |
| 2010/0153081 | A1 | 6/2010 | Belletre et al. |
| 2011/0249235 | A1 * | 10/2011 | Duis ............... G02C 7/04 264/1.36 |
| 2012/0194778 | A1 | 8/2012 | Skudder et al. |
| 2012/0271599 | A1 | 10/2012 | Lavallee et al. |
| 2013/0258275 | A1 * | 10/2013 | Toner ............... A61F 2/1627 623/6.22 |
| 2014/0063445 | A1 | 3/2014 | Caldarise et al. |
| 2016/0091737 | A1 | 3/2016 | Kim et al. |
| 2017/0082868 | A1 | 3/2017 | Bailey |
| 2018/0129071 | A1 | 5/2018 | Vidal et al. |
| 2018/0313717 | A1 | 11/2018 | Wang et al. |
| 2019/0391412 | A1 | 12/2019 | Bailey |
| 2021/0382323 | A1 * | 12/2021 | Bailey ............... G02C 7/045 |
| 2022/0163819 | A1 * | 5/2022 | Bailey ............... G02C 7/048 |
| 2023/0161179 | A1 * | 5/2023 | Raasch ............... G02C 7/043 351/159.02 |

FOREIGN PATENT DOCUMENTS

| | | |
|---|---|---|
| CN | 105629504 | 6/2016 |
| CN | 107811751 | 3/2018 |
| DE | 102010019961 A1 | 11/2011 |
| EP | 0102223 | 3/1984 |
| EP | 0887685 | 12/1998 |
| EP | 1879064 | 1/2008 |
| EP | 2622404 | 6/2018 |
| FR | 2582416 | 11/1986 |
| GB | 2401954 | 11/2004 |
| GB | 2497424 | 6/2013 |
| JP | S5953812 A | 3/1984 |
| JP | H09325304 A | 12/1997 |
| JP | 11-514753 | 12/1999 |
| JP | 2014-48666 | 3/2014 |
| TW | 201621406 A | 6/2016 |
| WO | 8907281 | 8/1989 |
| WO | WO-8907281 A1 * | 8/1989 ............ G02C 7/041 |
| WO | 92/22845 | 12/1992 |
| WO | 97/16760 | 5/1997 |
| WO | 98/14820 | 4/1998 |
| WO | 2005050291 | 6/2005 |
| WO | 2015066616 | 5/2015 |
| WO | 2015194120 | 12/2015 |
| WO | 2019/046714 | 3/2019 |

OTHER PUBLICATIONS

Office Action issued for Japanese Application No. 2019-515919, dated Apr. 5, 2022.
Raasch, T. Aberrations and spherocylindrical powers within subapertures of freeform surfaces. J. Opt. Soc. Am. A 28, 2642-2646 (2011).
Examination Report issued for Malaysian Application No. PI 2019001627, dated Oct. 5, 2022.
European Search Report issued for Application No. 20773904.6, dated Dec. 6, 2022.
Korean Intellectual Property Office. Final Office Action. Issued in Patent Application No. 10-2019-7011606, dated Jul. 27, 2022. 5 pages, including translation.
Brazilian Intellectual Property Office. Preliminary Office Action. Issued in Brazilian Patent Application No. BR112019005750-1, dated Aug. 31, 2022. 5 pages, including translation.
Intellectual Property Corporation of Malaysia. Examination Report. Issued in Malaysian Application No. PI 2019001627, dated Oct. 5, 2022. 2 pages.
U.S. Patent and Trademark Office. International Search Report and Written Opinion. Issued in PCT Application No. PCT/US2021/026409, dated Jul. 22, 2021. 17 pages.
Examination Report issued for Australian Application No. 2022202001, dated Apr. 12, 2023.
Office Action issued for Korean Patent Application No. 10-2019-7011606, dated Jan. 17, 2022.
Notice of Alloawance issued for U.S. Appl. No. 16/642,982, dated Jan. 27, 2022.
International Search Report and Written Opinion issued for Application No. PCT/US2020/023528, dated Jun. 4, 2020.
International Search Report and Written Opinion issued for Application No. PCT/US2018/049084, dated Oct. 29, 2018.
International Preliminary Report on Patentability issued for Application No. PCT/US2018/049084, dated Mar. 12, 2020.
International Search Report and Written Opinion for Application No. PCT/US2017/048617. Mailed by the U.S. International Searching Authority dated Nov. 8, 2017. 10 pages.
International Preliminary Report on Patentability issued for Application No. PCT/US2017/048617, dated Mar. 26, 2019, 7 pages.
Extended European Search Report issued by the European Patent Office in Application No. EP17853644.7 dated May 26, 2020. 10 pages.
Communication Pursuant to Rule 164(1) EPC, issued for Application No. 18852131.4, dated May 21, 2021, 11 pages.
Extended European Search Report, issued for Application No. 18852131.4, dated Sep. 21, 2021, 13 pages.
Examination Report issued by the Australian Intellectual Property Office in Australian Application No. 2017330483 dated Feb. 1, 2021. 7 pages.
Office Action issued for Chinese Application No. 201780070220.3, dated Apr. 13, 2020. 13 pages including English translation.
Office Action issued for Chinese Application No. 201780070220.3, dated Sep. 14, 2020.

(56) References Cited

OTHER PUBLICATIONS

Office Action issued for Chinese Application No. 201780070220.3, dated Dec. 22, 2020. 19 pages.
Office Action issued for Chinese Application No. 201780070220.3, dated Jun. 28, 2021.
Office Action and Search Report issued by the Russian Patent Office in Russian Application No. 2019112014 dated Dec. 14, 2020. 15 pages.
English Translation of Decision on Granting Russian Application No. 019112014/28(023349) dated Jul. 15, 2021.
Examination report issued for Indian Application No. 201917014551, dated Mar. 25, 2021.
Office Action issued for Japanese Application No. 2019-515919, dated Aug. 17, 2021.
Bennett, et al., Clinical Contact Lens Practice, 2005, Table 27.5. Biofocal/Multifocal Contact Lens Fitting Guidelines, p. 539.
Kennard, D. W., and G. L. Smyth. "The causes of downward eyelid movement with changes of gaze, and a study of the physical factors concerned." The Journal of physiology 166.1 (1963): 178.
Kessing, A new division of the conjunctiva on the basis of X-ray examination, Acta Ophthalmologica vol. 46, 1967, 6 pages.
Kessing, Svend Vedel. "A new division of the conjunctiva on the basis of x-ray examination." Acta ophthalmologica 45.5 (1967): 680-683.
Messer, Prescribing for Astigmatism. Taming Those Tories. Feb. 1, 2016, 2 pages.
Polse, Kenneth A. "Contact Lens Fitting in Aphakia." American Journal of Optometry and Archives of American Academy of Optometry, Mar. 1969, pp. 213-219. (Year: 1969).
Quinn, Thomas G. "Avoiding the Low Riding Lens." Contact Lens Spectrum, Jul. 1, 2000, www.clspectrum.com/issues/2000/july-2000/avoiding-the-low-riding-lens. (Year: 2000).
Rueff, et al., Presbyopic and non-presbyopic contact lens opinions and vision correction preferences, Contact Lens and Anterior Eye 40.5 (2017): 323-328.
Snyder, Christopher. "Designing Minus Carrier RGP Lenses." Contact Lens Spectrum, Dec. 1, 1998, www.clspectrum.com/issues/1998/december-1998/designing-minus-carrier-rgp-lenses. (Year: 1998).
Young, Graeme. "Mathematical model for evaluating soft contact lens fit." Optometry and Vision Science 91.7 (2014): e167-e176.
Communication Pursuant to Article 94(3) EPC, issued for Application No. 18852131.4, dated May 25, 2023.
English translation of Office Action for Vietnamese Application No. 1-2019-01975 dated Jun. 29, 2023.
English Summary of Office Action for Argentine Application No. 20190102352 dated Jun. 30, 2023.
English translation of Notice of Reasons for Refusal for Japanese Application No. 2022-192875 dated Aug. 8, 2023.
Office Action issued for U.S. Appl. No. 16/642,982, dated Oct. 1, 2021.
Office Action issued for U.S. Appl. No. 17/331,059, dated Sep. 21, 2023.
Office Action issued for Canadian Application No. 3,038,057 dated Aug. 21, 2023.

* cited by examiner

CONTACT LENS COMPRISING A SUPERIOR LENTICULAR ASPECT

CROSS-REFERENCE TO RELATED APPLICATIONS

This application is a continuation application of U.S. application Ser. No. 16/782,816 filed Feb. 5, 2020, which will issue as U.S. Pat. No. 11,022,817 on Jun. 1, 2021, which is a continuation application of U.S. application Ser. No. 16/220,577 filed Dec. 14, 2018, now U.S. Pat. No. 10,598,957 issued Mar. 24, 2020, which is a continuation application of U.S. application Ser. No. 15/274,159 filed Sep. 23, 2016, now U.S. Pat. No. 10,191,302, which claims priority to and benefit of U.S. Provisional Application No. 62/222,376, filed Sep. 23, 2015, each of which are hereby fully incorporated by reference in their entireties.

BACKGROUND

The current state-of-the art in rotational stabilization includes back surface toricity (effective for rigid gas-permeable contact lenses), base-down and peri-ballast prism, or Dynamic Stabilization which is a modification of base-down prism. There are patients for whom one or none of the existing designs are sufficient to provide rotational stabilization for a contact lens. What is needed in the art are contact lenses that are alternating vision, meaning that the eye is focused by the contact lens for distance when looking far away and then focused by the contact lens for near when looking at an object that is nearby.

SUMMARY

The present disclosure relates to translating contact lenses that work when the cornea is spherical or toric. For rotational stabilization, the contact lenses disclosed herein have an advantage over base-down prism, peri-ballasting, and Dynamic Stabilization in that it uses the interaction between the lenticular aspect described below and the upper eyelid tarsal plate to stabilize the contact lens and may also use the interaction between the base of the prism and the lower eyelid. Interactions between the lens and one or both eyelids provides better stabilization in the lens design disclosed herein. This same contact lens design will also allow for the contact lens to have a translational movement when the patient looks from straight ahead gaze into downgaze. Instead of pushing the base of the prism in the contact lens upwards with the lower eyelid, as much of the prior art attempts to do, this design pulls the contact lens upwards with the superior lenticular aspect. This is because the lenticular aspect allows the contact lens to use a "lid-attached" fit, wherein the lens stays with the upper lid as the patient looks downwards.

The description below sets forth details of one or more embodiments of the present disclosure. Other features, objects, and advantages will be apparent from the description and from the claims.

BRIEF DESCRIPTION OF THE DRAWINGS

The accompanying figures, which are incorporated in and constitute a part of this specification, illustrate several aspects described below.

FIG. 1A shows the minus-carrier lenticular-like curve 101 located on the edge of the contact lens 100, while FIG. 1B shows the minus-carrier lenticular-like curve 101 located further from the edge of the contact lens 100.

DETAILED DESCRIPTION

The present disclosure now will be described more fully hereinafter with reference to specific exemplary embodiments. Indeed, the present disclosure can be embodied in many different forms and should not be construed as limited to the embodiments set forth herein.

Disclosed herein is a contact lens comprising a rounded, minus-carrier, lenticular-like curve over a central, upper portion of the lens. This contact lens is referred to throughout this disclosure as a "Buck-Eye Contact Lens."

The Buck-Eye Contact Lens disclosed herein couples two primary features in a design that creates: (1) rotational stability of the contact lens in all gazes, (2) upwards translation, or movement, of the contact lens when the eye is in downward gaze, and (3) a general, centered placement of the contact lens over the cornea and the pupil as needed as the person's gaze changes. By "upwards translation of the contact lens when the eye is in downward gaze" means that the contact lens is held in an upwards position when the patient looks down.

Figure 1A:
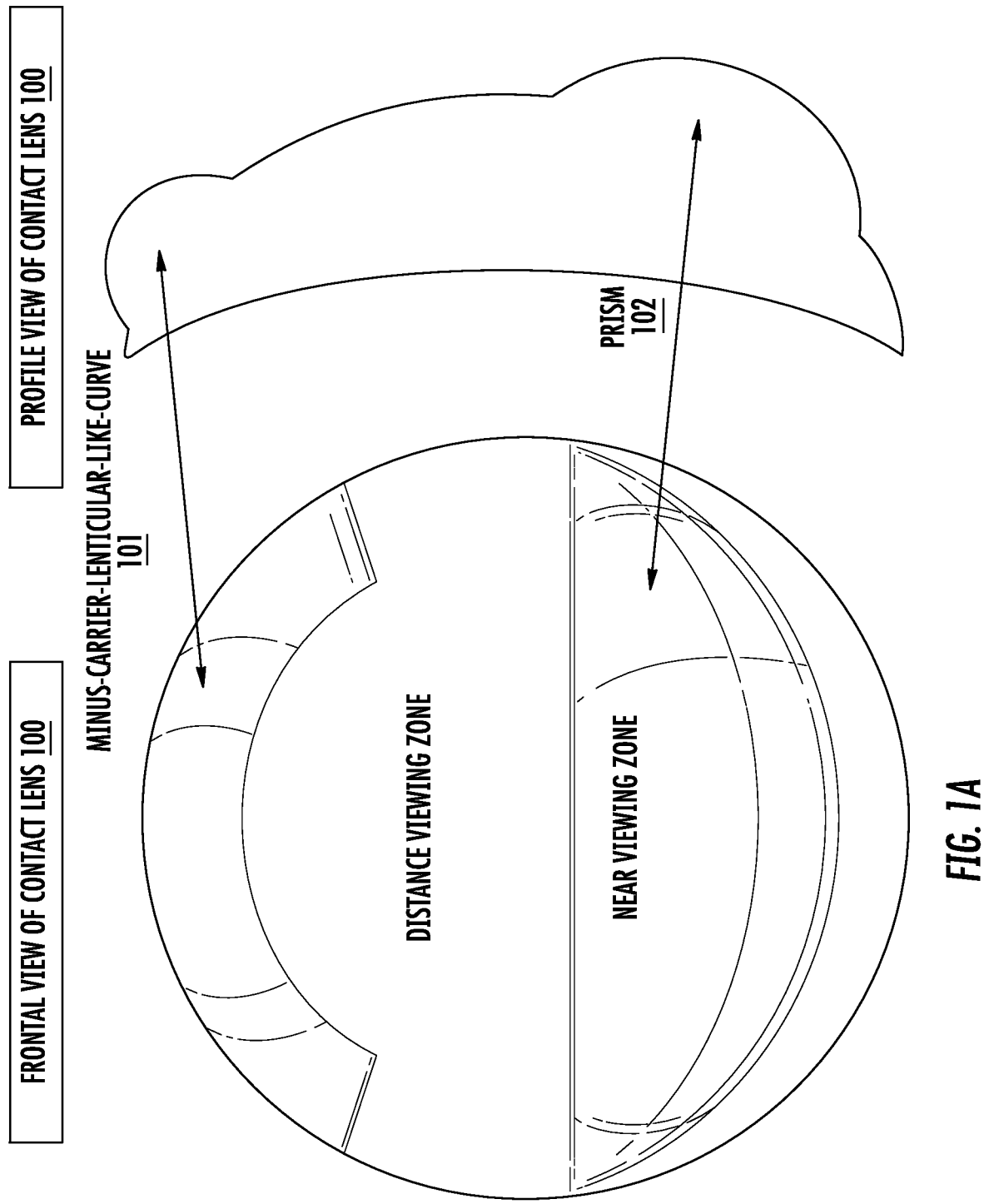
FIGS. 1A and 1B are schematic diagrams providing frontal and profile view of a contact lens according to lens designs disclosed herein.
Figure 1B:
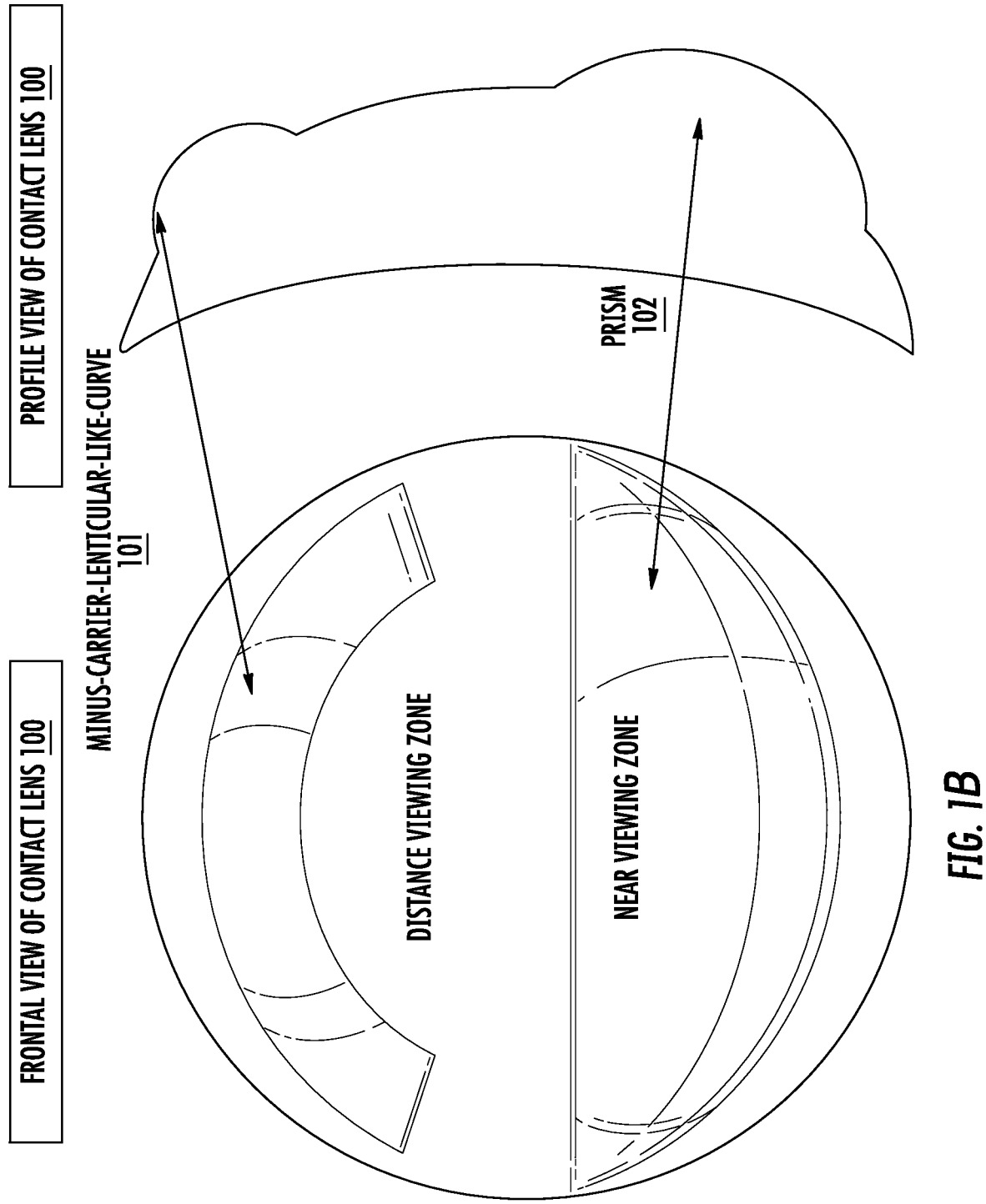
Figure 2:
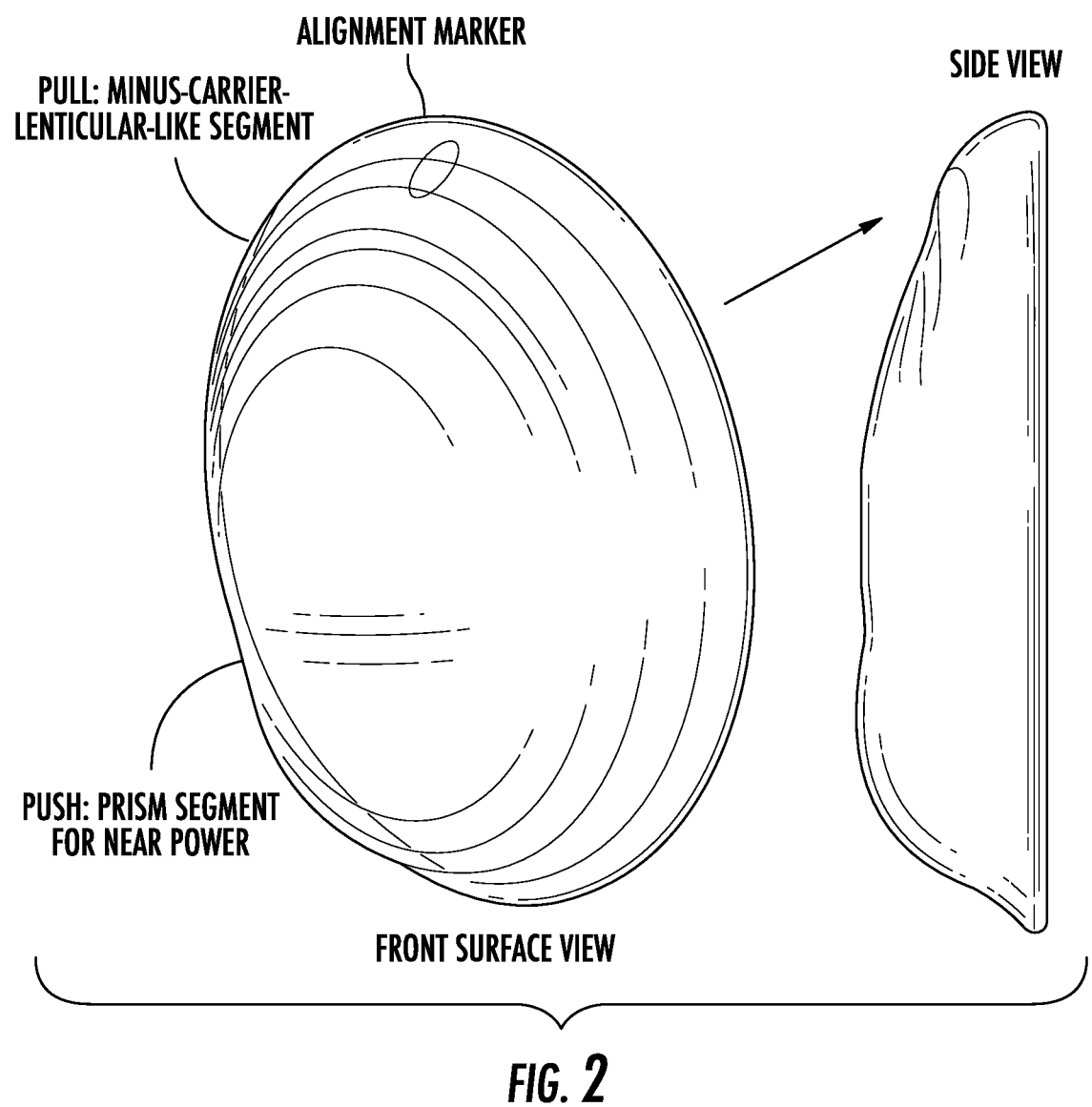
FIG. 2 is a schematic diagram of the Buck-Eye Contact Lens, showing the "push" and "pull" mechanism associated therewith.

Referring to FIGS. 1A and 1B, a schematic diagram of frontal and profile view of a contact lens 100 according to lens designs disclosed herein is illustrated. The first feature of the design is the placement of a rounded, minus-carrier-lenticular-like-curve 101 over the upper, central portion of the contact lens only. The second feature of the design is the possible use of prism 102 in the lower portion of the contact lens. The combined features of the contact lens disclosed herein provide rotational stabilization, translation, and/or centration. The Buck-Eye Contact Lens disclosed herein could be a rigid gas permeable or soft contact lens design, or a hybrid design, such that the contact lens has a rigid center with soft surround. The lens can be made of a material that can sense light activity or molecules in the ocular environment and that contains elements that modulate light or the surrounding ocular environment, i.e., liquid crystal displays, filters, photochromatic materials, compartments containing other materials, or sensors.

The minus-carrier-lenticular-like-curve 101 can be seen at the top of the contact lens 100. The minus-carrier-lenticular-like-curve 101 can be placed at the upper edge of the contact lens 100, as seen in FIG. 3A, or can be located some distance from the edge of the contact 100, as can be seen in FIG. 3B. For example, it can be located in the central, upper portion of the contact lens 100. The minus-carrier-lenticular-like-curve 101 can be 0.1, 0.2, 0.3, 0.4, 0.5, 0.6, 0.7, 0.8, 0.9, 1.0, 1.5, 2.0, 2.5, 3.0, 3.5, 4.0, 4.5, or 5.0 millimeters, or more, less, or any amount in-between, away from the outer edge of the contact lens 100. A prism 102 can be located in the lower half of the contact lens 100. The use of prisms is discussed in more detail herein.

The current state-of-the-art in translating contact lenses is a rigid gas permeable contact lens. There are currently no successful soft contact lenses that achieve translating vision. All of the prior art in translating soft contact lenses moves in the opposite direction of this design, i.e., all other designs attempt to thin the upper portion of the contact lens as much as possible, rather than making it thicker and attached to the upper lid. The contact lens disclosed herein provides a translating soft contact lens that is more comfortable and requires less adaptation time than a rigid gas permeable lens. Generally speaking, patients are more willing and able to wear a soft contact lens than a rigid gas permeable contact lens, and a soft contact lens requires less expertise to fit. The current state-of-the-art in bifocal or multifocal soft contact lenses is simultaneous vision. In these lenses, both the rays focusing the distance vision and the rays focusing the near vision are within the pupil at the same time. Thus, the patient must be able to ignore the rays that are not in focus. This leads to some degradation vision. The translating soft contact lens disclosed herein allow only light from one distance to be in focus at a time, providing clearer vision at each distance.

The other current state-of-the-art option for fitting presbyopic patients in soft contact lenses is called monovision. In this case, one eye is powered for distance vision (usually the dominant eye) and one eye is powered for near vision (usually the non-dominant eye). Some patients are unable to adapt to this type of lens, again, especially when the patient requires a greater reading add power. The difference between the two eyes becomes too uncomfortable. Also, it is well established that monovision correction in contact lenses or laser vision correction leads to a loss of depth perception. The translating soft contact lens disclosed herein allows for the use of higher reading add powers without degradation of the quality of distance vision. Because both eyes are fully and equally corrected at distance and near in the disclosed design, there is no induced loss of depth perception. The translating soft contact lens disclosed herein can also have an optical segment that provides a gradient of power change between the distance and near segments.

The contact lens disclosed herein are designed to suit many practical purposes. For example, in both rigid and soft contact lenses, the lens designs disclosed herein provide rotational stabilization in all gazes for toric contact lens designs, contact lenses designed to correct for various types of ocular aberration beyond a spherical correction, for electronically-generated and/or virtual optically displayed images, and/or bifocal or multifocal contact lenses. Additionally, the lens designs disclosed herein create upwards translation of a bifocal/multifocal contact lens in downward gaze. Furthermore, the lens designs disclosed herein achieve a "lid attached" fit similar to rigid gas permeable contact lens, i.e., keep the contact lens attached under the upper lid before, during, and after a blink.

In one embodiment, the upper portion of the contact lens interacts with an upper lid of the wearer. The upper portion of the contact lens that interacts with the upper lid can comprise 5, 10, 15, 20, 25, 30, 35, 40, 45, 50, 55, 60, 65, 70, or 75% of the area between the upper edge of the contact lens and the geometric center of the contact lens. For example, the area of the upper portion of the contact lens (meaning the "top half" of the contact lens, or the area between the upper edge and geometric center of the contact lens) that interacts with the upper lid can comprise 10 to 50% of the upper area of the lens.

Traditionally, the minus carrier lenticular is used in rigid gas permeable contact lenses in order to create a lid attached fit in a plus-shaped contact lens. In the Buck-Eye Contact Lens design disclosed herein, a rounded, minus-carrier-lenticular-like-curve is placed in the central, upper portion of the lens only, rather than over a larger portion of the lens circumference. The lens designs disclosed herein have a smaller area where a relatively thick edge is present to interact with the upper eyelid margin, and the minimal presence of the lenticular improves comfort over a more traditional minus carrier lenticular that would ordinarily be placed over the entire lens circumference. There is enough surface area and thickness of the lenticular present in the contact lens disclosed herein, however, to interact with the upper tarsal plate to assist with centration and rotational stability.

The upper eyelid can also interact with the prism in the lower portion of the contact lens according to the lens designs disclosed herein. The edge of the upper eyelid squeezes the thicker, base of the prism of the Buck-Eye Contact Lens downwards with each blink. The base of the prism also interacts with the lower eyelid with each blink; therefore, the base of the prism is placed above the lower contact lens margin, high enough to remain above the lower eyelid when the eye is open. Just as multiple base curve options are available for fitting different corneal curvatures, multiple heights of the prism base are optionally used to account for differences in aperture size and position of the eyelids. In addition, multiple overall diameters of the contact lens can also be used. In other words, the prism portion can provide a change in power from the central optic zone of the contact lens. The base of the prism may not slide more than 1, 1.5, 2, 2.5, or 3 millimeters (mm) behind the lower lid, when in the patient is looking straight ahead and/or downwards when the eye is open and during the blink.

As disclosed above, the contact lens comprises a relatively thick area compared to the remaining portion of the contact lens. This area of thickness can be 1.5, 2, 3, 4, 5, 6, 7, 8, 9, or 10 times thicker than the remaining "non-thick" portion of the contact lens. For example, the relatively thick area can comprise a thickest portion, which is 2 to 5 times thicker than the remaining portion of the contact lens.

The Buck-Eye Contact Lens disclosed herein can be used in the correction of ametropia (myopia, hyperopia, astigmatism, and/or higher order aberrations) in patients with or without presbyopia, i.e., a reading add that moves upwards through translation, in patients with other accommodative disorders, and/or patients with a binocular vision disorder can also be provided in the lens designs disclosed herein. Presbyopia affects 100% of the population who live long enough (—45 years of age) to develop the condition. The Buck-Eye Contact Lens can also treat other accommodative disorders, or binocular vision disorder. The Buck-Eye Contact Lens can also be used to display an electronically-generated and/or other virtual optically-displayed image.

Currently marketed contact lenses provide very limited options in terms of design parameters such as diameter and curvature. The disclosed lenses achieve translation in a soft contact lens. Soft contact lenses are typically only feasible to manufacture in two base curve options, and very few are offered in multiple diameters. These multiple options in these two parameters in addition to the ability to vary the prism height, size, amount, or axis are optionally considered in the lens designs disclosed herein. Back surface toricity takes advantage of a toric, rather than spherical, corneal shape that occurs in some patients with astigmatism. The lenses disclosed herein still work when the cornea is spherical (not toric). The described lenses also have an advantage over base-down prism, peri-ballasting, and Dynamic Stabilization in that it optionally uses a lenticular aspect described above to use the upper eyelid tarsal plate to stabilize the contact lens in addition to the prismatic interaction of the lower lid. Interactions with both lids provide better stabilization.

Disclosed herein are methods of making the contact lenses disclosed herein. For example, disclosed is a method of making a contact lens, the method comprising manufacturing a contact lens comprising forming a rounded, minus-carrier, lenticular-like curve over a central, upper portion of the lens. The contact lens can further comprise a base down prism in the inferior portion of the lens where the minus-carrier, lenticular-like curve. In one example, the base down prism is added to the lens in a second step of a manufacturing process.

Also disclosed is a method of treating an individual in need of vision correction, the method comprising dispensing the contact lens disclosed herein to the individual, thereby treating the individual in need of vision correction. In one example, the individual has been diagnosed with ametropia. In another example, the individual has been diagnosed with presbyopia, another accommodative disorder, and/or a binocular vision disorder.

As used in the specification, and in the appended claims, the singular forms "a," "an," "the," include plural referents unless the context clearly dictates otherwise.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A rotationally stable contact lens comprising:
an eye-facing side and a side that faces away from the eye; and
wherein the contact lens has a first thickness in a superior portion of the contact lens that is greater than a second thickness at any other portion of the contact lens, said first and second thicknesses defined by an axial distance between the eye-facing side and the side that faces away from the eye;
wherein the first thickness is shaped to interact with an upper tarsal plate of an upper eyelid of a wearer and said first thickness is configured to attach the contact lens to the upper eyelid providing rotational stabilization to the contact lens.

2. The rotationally stable contact lens of claim 1, wherein the contact lens comprises a soft contact lens.

3. The rotationally stable contact lens of claim 1, wherein the contact lens comprises a rigid gas permeable contact lens.

4. The rotationally stable contact lens of claim 1, wherein the contact lens comprises a hybrid contact lens.

5. The rotationally stable contact lens of claim 1, wherein the attachment of the contact lens to the upper eyelid provides centration to the contact lens.

6. The rotationally stable contact lens of claim 1, wherein the first thickness comprises a rounded, minus-carrier, lenticular curve.

7. The rotationally stable contact lens of claim 1, wherein the contact lens comprises a multi-focal contact lens.

8. The rotationally stable contact lens of claim 1, wherein the attachment of the contact lens to the upper eyelid causes the contact lens to translate upward in a downgaze of the wearer to place a viewing zone of the contact lens over a pupil or cornea of the wearer.

9. The rotationally stable contact lens of claim 8, wherein the viewing zone of the contact lens is one of a plurality of viewing zones comprising at least a distance viewing zone and a near viewing zone.

10. The rotationally-stable contact lens of claim 9, wherein at least one of the distance viewing zone and the near viewing zone remains above a lower eyelid margin of the wearer when the eye is open.

11. The rotationally stable contact lens of claim 1, wherein the central portion of the contact lens further comprises a liquid crystal material, a photochromic material, a sensor, or a filter.

12. The rotationally stable contact lens of claim 11, wherein the photochromic material is used to display an image on the contact lens.

13. The rotationally stable contact lens of claim 11, wherein the liquid crystal material is used to display an image on the contact lens.

14. The rotationally stable contact lens of claim 13, wherein the image comprises an electronically-generated and/or other virtual optically-displayed image.

15. The rotationally stable contact lens of claim 1, wherein the contact lens further comprises a base down prism.

16. The rotationally stable contact lens of claim 15, wherein the base down prism provides a change in power from a central optic zone of the contact lens.

17. The rotationally stable contact lens of claim 15, wherein the base down prism is located in an inferior portion of the lens portion.

18. The rotationally stable contact lens of claim 17, wherein the base down prism comprises a base having a thickness greater than a top of the prism.

19. The rotationally stable contact lens of claim 18, wherein an edge of an upper eyelid of the wearer squeezes the thicker base of the prism downwards with each blink.

20. The rotationally stable contact lens of claim 18, wherein the base of the prism is configured such that it interacts with a lower eyelid with each blink of the wearer, so that the base of the prism remains above a lower eyelid margin.

* * * * *